US012596900B2

(12) United States Patent
Bartlow

(10) Patent No.: US 12,596,900 B2
(45) Date of Patent: Apr. 7, 2026

(54) IMAGE COMPARISON CALIBRATIONS

(71) Applicant: Hewlett-Packard Development Company, L.P., Spring, TX (US)

(72) Inventor: Brian Todd Bartlow, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 261 days.

(21) Appl. No.: 18/409,025

(22) Filed: Jan. 10, 2024

(65) Prior Publication Data

US 2025/0225355 A1 Jul. 10, 2025

(51) Int. Cl.
*G06K 15/02* (2006.01)
(52) U.S. Cl.
CPC .................................. *G06K 15/027* (2013.01)
(58) Field of Classification Search
CPC .......................... G06K 15/027; H04N 1/00087
See application file for complete search history.

(56) References Cited

U.S. PATENT DOCUMENTS

| | | | |
|---|---|---|---|
| 8,666,195 B1 | 3/2014 | Mierle | |
| 11,126,899 B2 | 9/2021 | Bartlow | |

| | | | | |
|---|---|---|---|---|
| 2010/0125356 A1* | 5/2010 | Shkolnik | ................ | B33Y 30/00 |
| | | | | 700/118 |
| 2011/0044494 A1* | 2/2011 | Bradley | ................ | G10L 19/018 |
| | | | | 382/100 |
| 2012/0072827 A1* | 3/2012 | Isobe | .................... | G06F 3/1211 |
| | | | | 715/234 |
| 2014/0160497 A1* | 6/2014 | Lawton | .............. | H04N 1/00053 |
| | | | | 358/1.9 |
| 2015/0350491 A1* | 12/2015 | Iwata | ........................ | H04N 1/40 |
| | | | | 358/475 |
| 2019/0297226 A1* | 9/2019 | Ohkubo | ................... | H04N 1/60 |
| 2019/0361380 A1* | 11/2019 | Zaima | ................ | G03G 15/5058 |
| 2021/0089846 A1* | 3/2021 | Bartlow | .............. | G06K 15/027 |
| 2021/0264581 A1* | 8/2021 | Ishii | ..................... | G06K 15/027 |
| 2023/0239412 A1* | 7/2023 | Misawa | ............... | H04N 1/0097 |
| | | | | 358/3.27 |
| 2024/0328859 A1* | 10/2024 | Nakashio | .................. | G01J 3/52 |
| 2025/0206034 A1* | 6/2025 | Mader | ................... | B41J 2/2146 |

\* cited by examiner

*Primary Examiner* — Nicholas Pachol
(74) *Attorney, Agent, or Firm* — Foley & Lardner LLP

(57) ABSTRACT

An example device may include a controller comprising a processor and a memory storing instructions executable by the processor, wherein the processor is to execute the instructions to cause an image forming device to print an image onto a target sheet of media routed through a media path from an input media tray; receive an input corresponding to the image printed onto the target sheet of media; determine, based on the input, a degree of rotation of the image; and calibrate a rotation parameter of the image forming device in response to the degree of rotation determined from the input.

19 Claims, 9 Drawing Sheets

100 — CONTROLLER

106 — PROCESSOR

108 — MEMORY RESOURCE

102 — IMAGE FORMING DEVICE

110 — INPUT TRAY

112 — MEDIA PATH

104 — TARGET SHEET OF MEDIA

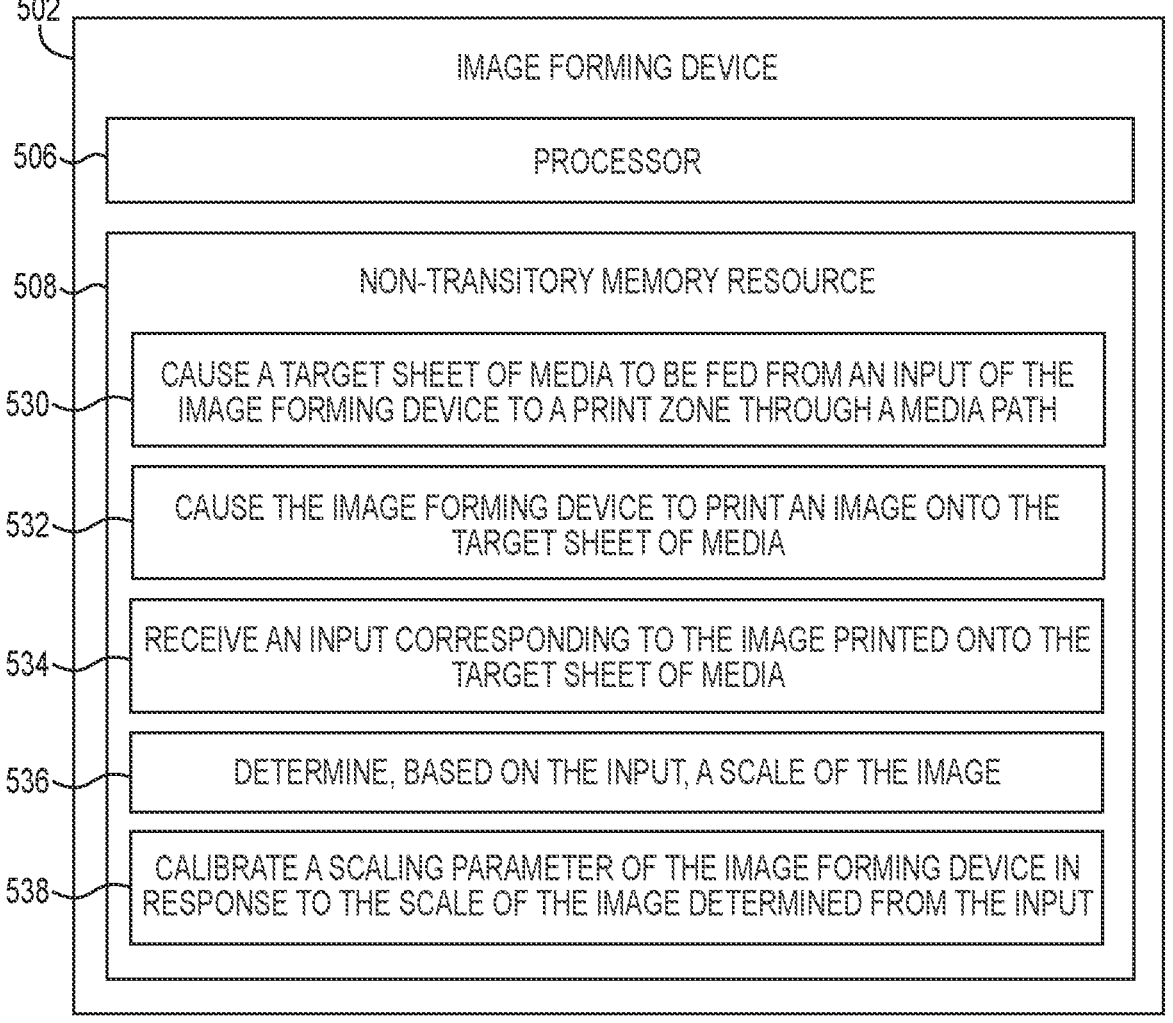

502

IMAGE FORMING DEVICE

506 — PROCESSOR

508 — NON-TRANSITORY MEMORY RESOURCE

530 — CAUSE A TARGET SHEET OF MEDIA TO BE FED FROM AN INPUT OF THE IMAGE FORMING DEVICE TO A PRINT ZONE THROUGH A MEDIA PATH

532 — CAUSE THE IMAGE FORMING DEVICE TO PRINT AN IMAGE ONTO THE TARGET SHEET OF MEDIA

534 — RECEIVE AN INPUT CORRESPONDING TO THE IMAGE PRINTED ONTO THE TARGET SHEET OF MEDIA

536 — DETERMINE, BASED ON THE INPUT, A SCALE OF THE IMAGE

538 — CALIBRATE A SCALING PARAMETER OF THE IMAGE FORMING DEVICE IN RESPONSE TO THE SCALE OF THE IMAGE DETERMINED FROM THE INPUT

FIG. 5

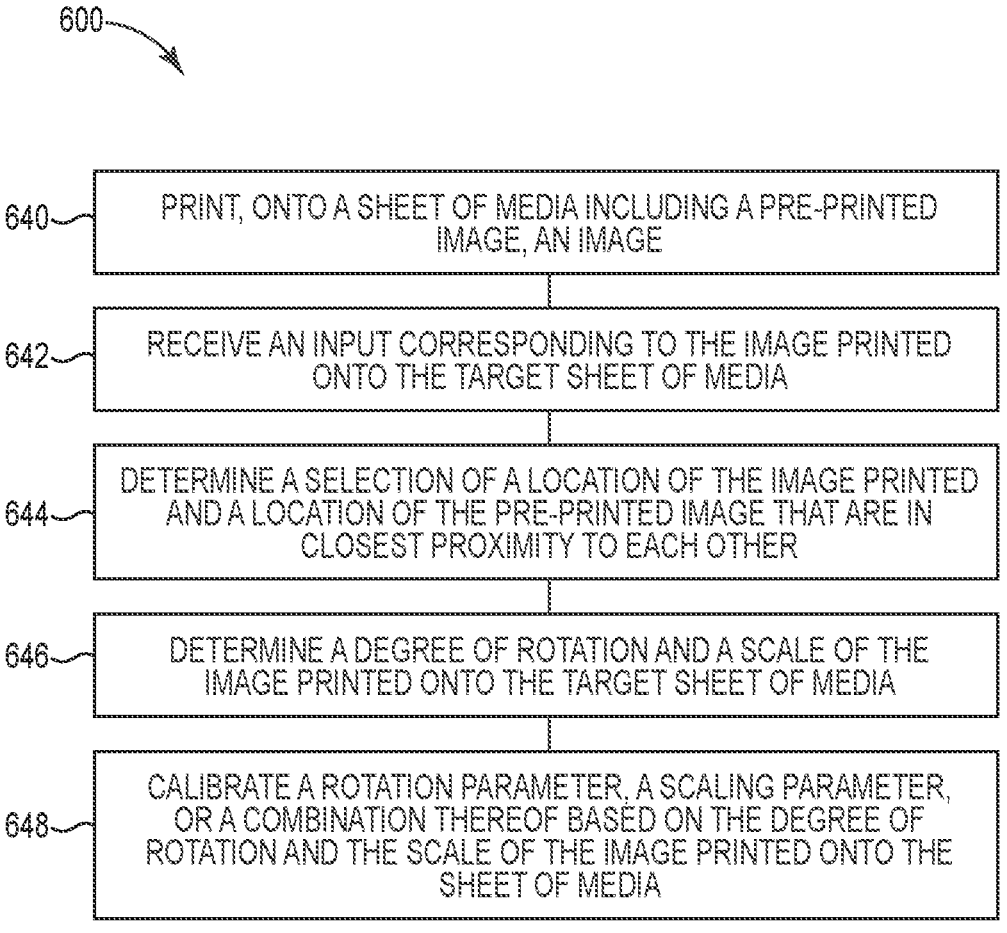

600

640 — PRINT, ONTO A SHEET OF MEDIA INCLUDING A PRE-PRINTED IMAGE, AN IMAGE

642 — RECEIVE AN INPUT CORRESPONDING TO THE IMAGE PRINTED ONTO THE TARGET SHEET OF MEDIA

644 — DETERMINE A SELECTION OF A LOCATION OF THE IMAGE PRINTED AND A LOCATION OF THE PRE-PRINTED IMAGE THAT ARE IN CLOSEST PROXIMITY TO EACH OTHER

646 — DETERMINE A DEGREE OF ROTATION AND A SCALE OF THE IMAGE PRINTED ONTO THE TARGET SHEET OF MEDIA

648 — CALIBRATE A ROTATION PARAMETER, A SCALING PARAMETER, OR A COMBINATION THEREOF BASED ON THE DEGREE OF ROTATION AND THE SCALE OF THE IMAGE PRINTED ONTO THE SHEET OF MEDIA

FIG. 6

IMAGE COMPARISON CALIBRATIONS

BACKGROUND

Image forming devices may be utilized in printing, scanning, copying, and/or faxing of a media. Image forming devices may include various hardware such as rollers, belts, sensors, motors, gears, etc. used in transporting of the media though a media path for a printing, scanning, copying, and/or faxing process. During a printing process, image forming devices may operate to dispense a print substance onto a substrate surface of the media in a predetermined pattern.

BRIEF DESCRIPTION OF THE DRAWINGS

FIG. 3E illustrates an example of a rotational offset of an image.

FIG. 3F illustrates an example of a positioning, scaling, and rotational offset of an image.

FIG. 5 illustrates an example of a processor associated with a memory for performing a calibration on an image forming device.

FIG. 6 illustrates an example of a method for calibrating a device based on a comparison between a pre-printed image and an image printed onto a target sheet of media.

DETAILED DESCRIPTION

Figure 1:
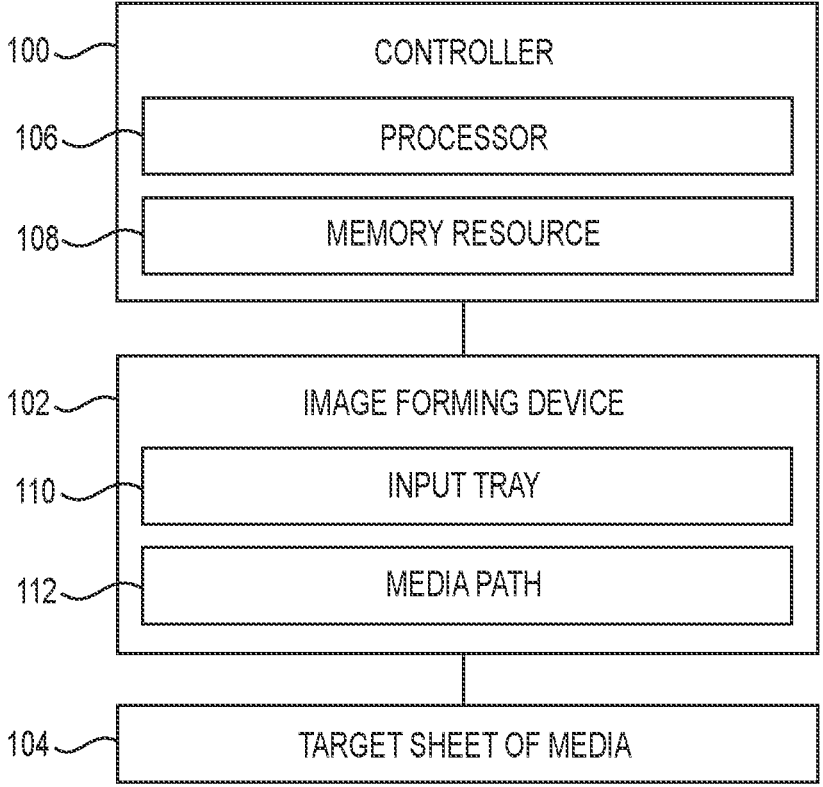
FIG. 1 illustrates an example of a controller for calibrating an image based on a comparison between an image printed and a target image.

Image forming devices may be used for various purposes, such as for printing, scanning, copying, and/or faxing. Example image forming devices may use a marking technology to form text and/or images onto a substrate surface. Markings, including text and/or images, may be formed on the substrate surface in a predetermined pattern in response to reception of print data corresponding to the predetermined pattern. The substrate surface may be a part of a type of suitable print media such as a sheet or roll material including paper, card stock, transparencies, polyester, plywood, foam board, fabric, canvas, photopolymers, plastics, composite, metal, wood, build material for additive printing, print target, and the like. To form the markings on the substrate surface, the image forming device may supply a printing substance, such as a printing fluid (e.g., ink), to the media.

Image forming devices may include various hardware used in transporting of the media though a media path and in printing, scanning, copying, and/or faxing of the media. Various hardware may include rollers, belts, sensors, motors, gears, etc. The hardware within the image forming device may be manufactured within specified tolerances affecting the size, shape, traction, accuracy, performance, etc. of the hardware. Wear and tear over time caused by use of the image forming device may further affect the hardware tolerances. Accordingly, affected tolerances within the image forming device may cause a non-uniformed print, scan, copy, or fax of a media. Accordingly, the image forming device may create images on the substrate surface that do not correspond with the predetermined pattern received in the print data.

In some examples, an inaccurate or non-uniformed printing (or scanning, copying, and/or faxing) of an image may result in poor quality of the image or a rejection of the image and/or print causing wasted resources and time. For example, images may be printed onto a sheet of labels where inaccurate placement of the image may result in an uncentered image on a label or a portion of the image being printed off of an edge of a label. In a further example, an image may be printed onto a pre-printed form in order to fill out the form. Inaccurate centering, scaling, and/or rotation of the image may result in the image printed being overtop of an image of the pre-printed form, being illegible, and/or being printed off an edge of the form or media. As used herein, the term "overtop" refers to placement of one image in the same location on a media as another image of the media.

Image comparison calibrations according to the disclosure can allow for calibrating a position of a print of an image onto a media. For example, a pre-printed image can be located on a pre-printed target sheet of media and compared to another image printed overtop of the pre-printed image. Various parameters of the image forming device can thus be calibrated based upon the comparison, which can improve the accuracy and quality of the print (or scan, copy, and/or fax) of the image forming device, as compared with previous approaches. Improving the accuracy and quality of print can result in a reduction in waste of time, resources, and cost resulting in a more efficient and environmentally friendly use of media and an improved user experience.

FIG. 1 illustrates an example of a controller 100 for calibrating an image based on a comparison between an image printed and a target image. The controller 100 may be coupled to an image forming device 102. It should be understood that the example controller 100 and the example image forming device 102 in FIG. 1 may include additional features and that some of the features described herein may be removed and/or modified without departing from the scope of the controller 100 and/or the image forming device 102.

The image forming device 102 may include an input tray 110. The input tray 110 may be a media input tray used on inkjet and/or laser image forming devices 102 and may be either fixed or removable depending on the type of input tray 110 or image forming device 102. The image forming device 102 may further include a media path 112. Media may be fed from the input tray 110 to a print zone of the image forming device 102 through the media path 112 utilizing hardware of the image forming device 102 such as rollers, belts, sensors, motors, gears, etc.

The controller 100 may be coupled to the image forming device 102. For example, the image forming device 102 may include the controller 100 or the controller 100 may be a part of a device separate from and communicatively coupled to the image forming device 102 via a wired or wireless connection. The controller 100 may comprise a processor 106 and a memory resource 108. The memory resource 108 may store instructions executable by the processor 106. For example, the processor 106 may execute instructions stored on the memory resource 108 to cause the image forming device 102 to print an image onto a target sheet of media 104 routed through the media path 112 from the input tray 110. The image may be formed on the target sheet of media 104 in a predetermined pattern in response to reception, by the image forming device 102, of specific print data corresponding to the predetermined pattern.

The processor 106 of the controller 100 may further execute instructions to receive an input corresponding to the image printed onto the target sheet of media 104. The input may be received via a scanner and/or via an interface coupled to the controller 100 and/or image forming device 102. The memory resource 108 may include further instructions, executed by the processor 106, to determine, based on the input, a degree of rotation, a scaling offset, and/or a positioning offset of the image. For example, and as is further described herein, the target sheet of media 104 may include a target image pre-printed onto the target sheet of media 104. The pre-printed image may correspond to the predetermined pattern received in the specific print data. The image forming device 102 may print an image overtop of the pre-printed image. The image printed may be compared to the pre-printed image and the received input corresponding to the image printed onto the target sheet of media 104 may be based on the comparison between the image printed and the pre-printed image.

In this example, the memory resource 108 may include instructions executable by the processor 106 to calibrate a rotation parameter, a scaling parameter, and/or a position parameter of the image forming device 102 in response to the degree of rotation, the scaling offset, and/or the positioning offset determined from the input.

As used herein, a calibration of the rotation parameter, scaling parameter, and/or position parameter of the image forming device 102 aligns a print of the image forming device 102. For example, an image printed, in response to the reception of the predetermined pattern, of a calibrated image forming device 102 may correspond in a rotation, scale, and position to a pre-printed image of the target sheet of media 104.

Figure 2:
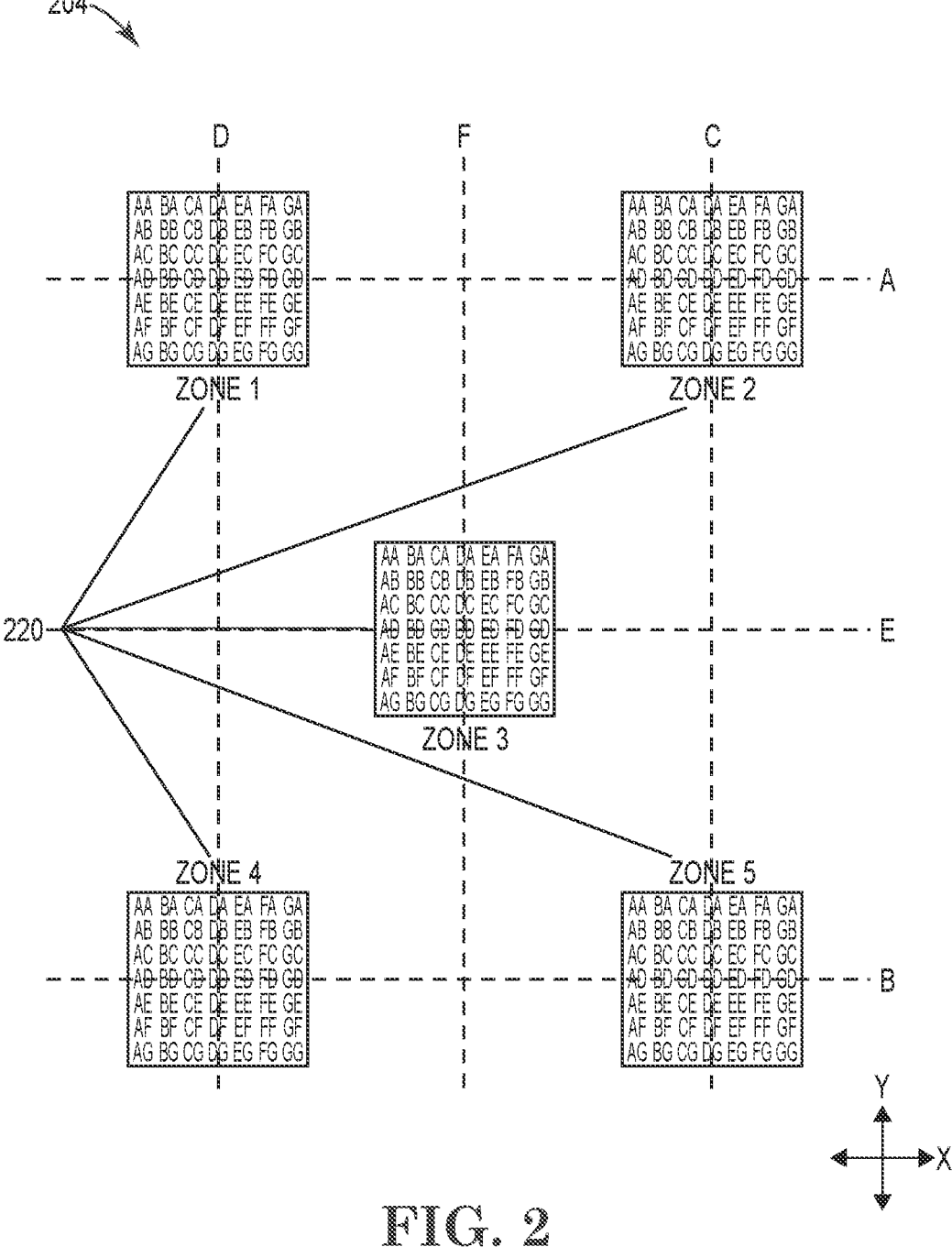
FIG. 2 illustrates an example of a target sheet of media.

FIG. 2 illustrates an example of a target sheet of media 204. As illustrated in FIG. 2, the target sheet of media 204 may include zones 220. Though five zones are depicted in FIG. 2, the target sheet of media 204 may include any number of zones arranged in any orientation or pre-determined pattern or may include one zone. The zones 220 may include pre-printed images such as letters, numbers, symbols, pictures, etc., hereinafter referred to as symbols. Letter combinations are illustrated in the figures as one example of symbols of a pre-printed image. As used herein, the term "pre-printed image" refers to an image or images previously printed onto a target sheet of media 204 that include a calibrated orientation in an x-axis position, y-axis position, vertical scaling position, horizontal scaling position, and a rotational position. Accordingly, the target sheet of media 204 may include the pre-printed pattern of symbols.

In some examples, each zone of the zones 220 may include a pre-printed pattern of symbols. The pre-printed pattern of symbols may be the same for each zone or each zone may include a different pre-printed pattern of symbols. As illustrated in FIG. 2 rows and columns of letter combinations may be printed in each zone. For example, seven rows and seven columns are depicted for a total of 49 letter combinations from AA to GG. In this example, the rows of the seven rows are identified by the letter A, B, C, D, E, F, or G with the first row being A and the seventh row being G and the columns of the seven columns are identified as A, B, C, D, E, F, or G with the first column being A and the seventh column being G. As such, in this example, the letter combination DD, indicating the fourth or middle row and the fourth or middle column, may be the center of the zone.

Further, when multiple zones 220 are used, the zones 220 may be located on the target sheet of media 204 so as to be used in determining an x-axis position, y-axis position, vertical scaling position, horizontal scaling position, and/or a rotational position of an image printed overtop of the target sheet of media 204, as is further described herein.

As one example, the target sheet of media 204 may include five zones 220 including two upper zones (e.g., Zone 1 and Zone 2 of FIG. 2), two lower zones (e.g., Zone 4 and Zone 5 of FIG. 2), and a middle zone (e.g., Zone 3 of FIG. 2), though examples are not so limited and the target sheet of media 204 may include any number of zones located in any number of locations.

In this example, the two upper zones may be positioned as to have a first center axis A in an X direction and the two lower zones may be positioned as to have a second center axis B in an X direction. Further a first upper zone and a first lower zone (e.g., Zone 2 and Zone 5 of FIG. 2) located on a first side of the target sheet of media 204 (e.g., on a right side of the target sheet of media 204) may be positioned to have a third center axis C in a Y direction and a second upper zone and a second lower zone (e.g., Zone 1 and Zone 4 of FIG. 2) located on a second side of the target sheet of media 204, opposite the first side (e.g., on a left side of the target sheet of media 204) may be positioned to have a fourth center axis D in a Y direction. The middle zone may be centered between the two upper zones and the two lower zones and may have a fifth center axis E in an X direction located between the first center axis A and the second center axis B and a sixth center axis F in a Y direction located between the third center axis C and the fourth center axis D. It is to be noted that the dashed lines and the X and Y orientation in FIG. 2 are for use as an illustration and description of the axes A-E and the X and Y orientation and may not be included on the target sheet of media 204.

Put another way, the center X axis of the two uppers zones may be substantially parallel to the center X axis of the middle zone and the two lower zones, the center Y axis of the two right side zones may be substantially parallel to the center Y axis of the middle zone and the two left side zones. The X axes may be equally spaced apart and the Y axes may be equally spaced apart. In some examples, all axes may be equally spaced apart or the distance between the X axes may be different than the distance between the Y axes. In some cases, the letter combination DD of the middle zone may correspond to the center of the target sheet of media 204. As used herein, the term "substantially" intends that the characteristic does not have to be absolute but is close enough so as to achieve the characteristic. For example, "substantially parallel" is not limited to absolute parallel.

These zones 220 and symbols of the target sheet of media 204 may be pre-printed in a calibrated x-axis position, y-axis position, vertical scaling position, horizontal scaling position, and rotational position. As such, the pre-printed image may be utilized in calibrating an x-axis position parameter, y-axis position parameter, vertical scaling parameter, horizontal scaling parameter, and/or a rotation parameter of an image forming device by comparing a corresponding image printed overtop of the pre-printed image to the pre-printed image, as is further described herein.

Figures 3A, 3B:
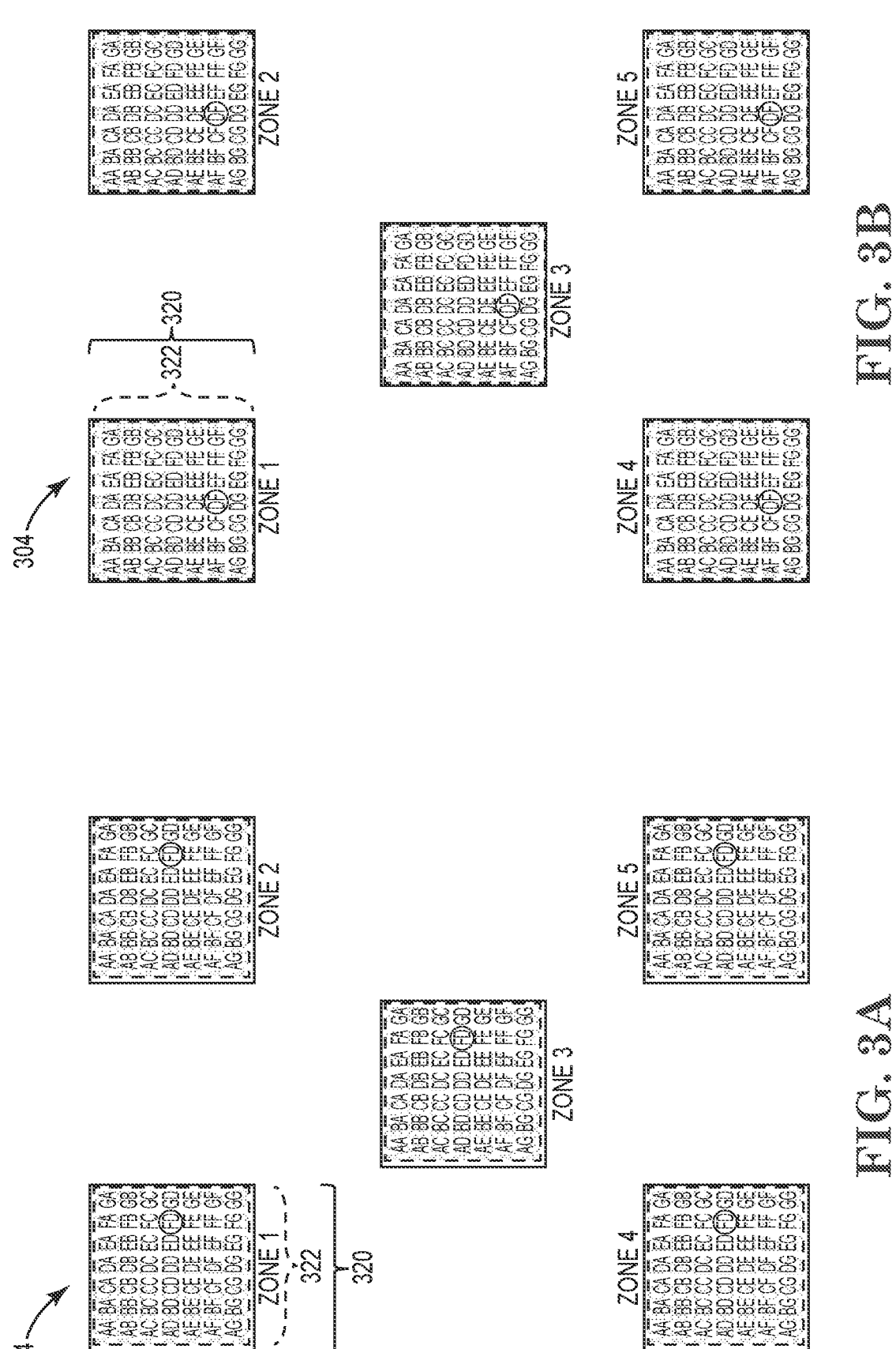
FIG. 3A illustrates an example of an x-axis positioning offset of an image.
FIG. 3B illustrates an example of a y-axis positioning offset of an image.

FIG. 3A illustrates an example of an x-axis positioning offset of an image printed 322. The image printed 322 may be overtop of zones 320 on a target sheet of media 304. The target sheet of media 304 may include the same components as the target sheet of media 204 as referenced in FIG. 2. For example, the target sheet of media 304 may include five zones 320 (though examples are not so limited) that include a pre-printed pattern of symbols AA through GG. Symbol DD of the pre-printed pattern of each zone may represent the center of each zone.

As previously described, a controller including a processor and a memory resource may be coupled to an image forming device. The processor may execute instructions stored on the memory resource to cause the image forming device to print the image 322 onto the target sheet of media 304.

The image printed 322 may include symbols arranged in zones. The symbols and zones of the image printed 322 may correspond to the pre-printed pattern of symbols and zones 320 of the pre-printed image of the target sheet of media 304. For example, the image printed 322 may include a pattern of rows and columns of symbols from AA to GG corresponding to the pattern of rows and columns of symbols AA through GG of the pre-printed image. As such, the symbol DD of the image printed 322 may indicate the center of the zone and may correspond to the center symbol DD of the pre-printed image.

Further, the image printed 322 may include a different spacing between each row of symbols and between each column of symbols as a spacing between each corresponding row of symbols and each corresponding column of symbols of the pre-printed image. In some examples, the spacing between the symbols of the image printed 322 may be greater than the spacing between the symbols of the pre-printed image. In other examples, as depicted in FIGS. 3A-3G, the spacing between the symbols of the image printed 322 may be less than the spacing between the symbols of the pre-printed image. For example, the spacing between each symbol of each zone of the pre-printed image may be a first distance and the spacing between each symbol of each zone of the image printed 322 may be a second distance different than the first distance (e.g., an example different between the first distance and the second distance may be ½ mm, 1 mm, etc.). It is to be noted that the dashed boxes around each zone of the image printed 322 as illustrated in FIGS. 3A-3G, may be used as a reference to each zone of the image printed 322 and as a comparison to the pre-printed image and may not be included in the image printed 322. Further, though reference designator 322 for the image printed and reference designator 320 for the zones may not be illustrated for each zone in FIGS. 3A-3G, it is to be understood that reference designators 322 and 320 are applied to each zone in FIGS. 3A-3G.

Locations of symbols printed onto the target sheet of media 304 may be compared to the corresponding locations of symbols pre-printed on the target sheet of media 304. In some examples, the comparison may be performed by a user and the comparison may be input (e.g., via an interface) into the controller. In some examples, the controller may receive an input (e.g., via a scanner) and the comparison may be performed by the controller.

The processor may execute instructions stored on the memory resource to determine an x-axis position and/or a y-axis position (as described in reference to FIG. 3B) of the image printed 322 based on the input (e.g., via the interface and/or via the scanner). An x-axis positioning offset of the image printed 322 may be indicated when the center DD of the image printed 322 is off in a direction horizontal to the center DD of the pre-printed image. For example, symbols of each zone of the image printed 322 may be compared to symbols of each corresponding zone of the pre-printed image. A symbol of the image printed 322 for each zone in closest proximity to a symbol of the pre-printed image for each corresponding zone may be selected based on the comparison. As such, a location of the pre-printed image and of the image printed 322 on each of the upper zones, lower zones, and the middle zone that are in closest proximity to each other may be selected.

The selection of locations of the image printed 322 on the upper zones, the lower zones, and the middle zone may indicate a positioning offset in a vertical direction, a horizontal direction, or a combination thereof. A positioning offset may be determined based on the selection being a distance away from the center, the DD symbol, of a zone. As depicted in FIG. 3A, symbol FD of the image printed 322 is in closest proximity to the symbol FD of the pre-printed image of the target sheet of media 304 for Zones 1, 2, 3, 4, and 5. Symbol FD may be selected for each zone. As the symbol FD is the second symbol from the center symbol DD in the X direction, the selection of symbol FD may indicate a positioning offset of the image printed 322 in a horizontal, x-axis direction. In the scenario where the distance between each symbol of the image printed 322 is less than the distance between each symbol of the pre-printed image by ½ mm, a selection of the second symbol from the center FD for each zone may indicate that the image printed 322 includes a horizontal, x-axis positioning offset of 1 mm. As illustrated in FIG. 3A, the positioning offset may indicate that images created by the image forming device (e.g., image printed 322) may not correspond with a predetermined pattern (e.g., pre-printed image) received by the image forming device in print data.

Accordingly, the processor may execute instructions stored on the memory resource to calibrate the x-axis position parameter of the image forming device based on the x-axis position of the image printed 322 onto the target sheet of media 304. For example, the processor may adjust a print placement setting of the image forming device a distance (e.g., 1 mm) corresponding to the x-axis position offset of the image printed 322. Calibrating the x-axis position parameter by adjusting the print placement setting may result in images created (e.g., image printed 322) by the image forming device corresponding with the predetermined pattern (e.g., pre-printed image) received by the image forming device in the print data.

FIG. 3B illustrates an example of a y-axis positioning offset of an image printed 322. The image printed 322 may be overtop of zones 320 on a target sheet of media 304. The target sheet of media 304 may include the same components as the target sheet of media 304 as referenced in FIG. 3A. For example, the target sheet of media 304 may include five zones 320 that include a pre-printed pattern of symbols AA through GG, the symbols of each zone being spaced apart a first distance. Symbol DD of the pre-printed pattern of each zone may represent the center of each zone. The image printed 322 may include symbols arranged in zones and corresponding to the pre-printed pattern of symbols and zones 320 of the pre-printed image. For example, the image printed 322 may include a pattern of rows and columns of symbols from AA to GG corresponding to the pattern of rows and columns of symbols AA through GG of the pre-printed image. As such, the symbol DD of the image printed 322 may indicate the center of the zone and may correspond to the center symbol DD of the pre-printed image. The symbols in each zone of the image printed 322 may be spaced apart a second distance. The second distance may be less than the first distance (e.g., ½ mm, 1 mm, etc.), though examples are not so limiting.

As previously described, a controller including a processor and a memory resource may be coupled to an image forming device. The processor may execute instructions stored on the memory resource to cause the image forming device to print the image 322 onto the target sheet of media 304. Locations of symbols printed onto the target sheet of media 304 may be compared to the corresponding locations of symbols pre-printed on the target sheet of media 304. In some examples, the comparison may be performed by a user and the comparison may be input (e.g., via an interface) into the controller. In some examples, the controller may receive an input (e.g., via a scanner) and the comparison may be performed by the controller. The processor may execute instructions stored on the memory resource to determine an x-axis position (as described in reference to FIG. 3A) and/or a y-axis position of the image printed 322 based on the input (e.g., via the interface and/or the scanner).

A y-axis positioning offset of the image printed 322 may be indicated when the center DD of the image printed 322 is off in a direction vertical to the center DD of the pre-printed image. For example, symbols of each zone of the image printed 322 may be compared to symbols of each corresponding zone of the pre-printed image. A symbol of the image printed 322 for each zone in closest proximity to a symbol of the pre-printed image for each corresponding zone may be selected based on the comparison. As such, a location of the pre-printed image and of the image printed 322 on each of the upper zones, lower zones, and the middle zone that are in closest proximity to each other may be selected.

The selection of locations of the image printed 322 on upper zones, lower zones, and a middle zone may indicate a positioning offset in a vertical direction, a horizontal direction, or a combination thereof. A positioning offset may be determined based on the selection being a distance away from the center, the DD symbol, of a zone. As depicted in FIG. 3B, symbol DF of the image printed 322 is in closest proximity to the symbol DF of the pre-printed image of the target sheet of media 304 for Zones 1, 2, 3, 4, and 5. Symbol DF may be selected for each zone. As the symbol DF is the second symbol from the center symbol DD in the Y direction, the selection of symbol DF may indicate a positioning offset of the image printed 322 in a vertical, y-axis direction. In the scenario where the distance between each symbol of the image printed 322 is less than the distance between each symbol of the pre-printed image by ½ mm, a selection of the second symbol DF from the center DD for each zone may indicate that the image printed 322 includes a vertical, y-axis positioning offset of 1 mm. As illustrated in FIG. 3B, the positioning offset may indicate that images created by the image forming device may not correspond with a predetermined pattern received by the image forming device in print data.

Accordingly, the processor may execute instructions stored on the memory resource to calibrate the y-axis position parameter of the image forming device based on the y-axis position of the image printed 322 onto the target sheet of media 304. For example, the processor may adjust a print placement setting of the image forming device a distance (e.g., 1 mm) corresponding to the y-axis position offset of the image printed 322. Calibrating the y-axis position parameter by adjusting the print placement setting may result in images created (e.g., image printed 322) by the image forming device corresponding with the predetermined pattern (e.g., pre-printed image) received by the image forming device in the print data.

In some cases, selection of symbols may indicate a positioning offset of the image printed 322 in both a horizontal, x-axis direction and a vertical, y-axis direction (not illustrated in the FIGS.). Accordingly, the processor may execute instructions stored on the memory resource to calibrate an x-axis position parameter, the y-axis position parameter, or a combination thereof, of the image forming device based on the position of the image printed 322 onto the target sheet of media 304.

Figures 3C, 3D:
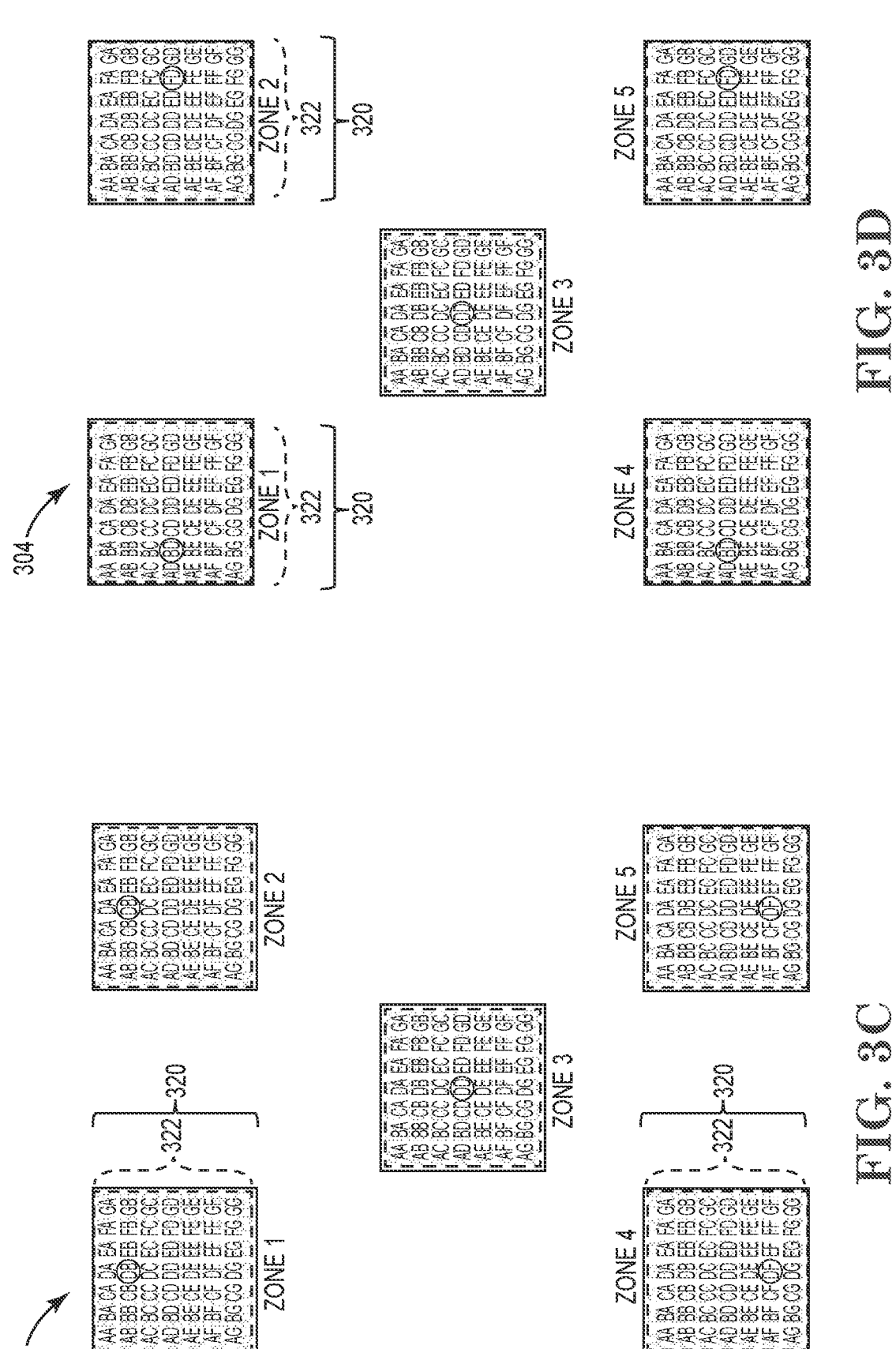
FIG. 3C illustrates an example of a vertical scaling offset of an image.
FIG. 3D illustrates an example of a horizontal scaling offset of an image.

FIG. 3C illustrates an example of a vertical scaling offset of an image printed 322. The image printed 322 may be overtop of zones 320 on a target sheet of media 304. The target sheet of media 304 may include the same components as the target sheet of media 304 as referenced in FIG. 3A and FIG. 3B. For example, the target sheet of media 304 may include five zones 320 (e.g., two upper zones, two lower zones, and a middle zone, though examples are not so limited) that include a pre-printed pattern of symbols AA through GG, the symbols of each zone being spaced apart a first distance. Symbol DD of the pre-printed pattern of each zone may represent the center of each zone. The image printed 322 may include zones including a pattern of rows and columns of symbols from AA to GG corresponding to the pattern of rows and columns of symbols AA through GG of the pre-printed image. As such, the symbol DD of the image printed 322 may indicate the center of the zone and may correspond to the center symbol DD of the pre-printed image. In some examples, the symbols in each zone of the image printed 322 may be spaced apart a second distance. The second distance may be less than the first distance (e.g., by ½ mm, 1 mm, etc.).

A processor of a previously described controller may execute instructions stored on a memory resource of the controller to cause an image forming device to print the image 322 onto the target sheet of media 304. Locations of symbols printed onto the target sheet of media 304 may be compared to the corresponding locations of symbols pre-printed on the target sheet of media 304. In some examples, the comparison may be performed by a user and the comparison may be input (e.g., via an interface) into the controller and/or the controller may receive an input (e.g., via a scanner) and the comparison may be performed by the controller. The processor may execute instructions stored on the memory resource to determine a scale of the image printed 322 based on the input. The instructions may further include determining a vertical scaling parameter and/or a horizontal scaling parameter (as described in reference to FIG. 3D) of the image forming device based on the scale of the image.

A vertical scaling offset of the image printed 322 may be indicated by the image printed 322 being stretched away from or contracted toward the vertical center DD of the pre-printed image. For example, symbols of each zone of the image printed 322 may be compared to symbols of each corresponding zone of the pre-printed image. A location of the pre-printed image and of the image printed 322 on each of upper zones, lower zones, and a middle zone that are in closest proximity to each other may be selected. As one example, the vertical scaling offset may be determined based on the selection of locations of the image printed 322 on the upper zones being a distance away from a vertical center axis of the pre-printed image upper zones, the selection of locations of the image printed 322 on the lower zones being a distance away from a vertical center axis of the pre-printed image lower zones, or a combination thereof, and the selection of a location of the image printed 322 on the middle zone corresponding to a vertical center axis location of the pre-printed image middle zone. In some examples, the selection of the image printed 322 on the upper zones may be different than the selection of the image printed 322 on the lower zones.

FIG. 3C depicts a vertical scaling offset resulting in stretching of an image away from the vertical center axis of the image, though examples are not so limited and a vertical scaling offset may result in a contracting of the image toward the vertical center axis of the image.

As depicted in FIG. 3C, symbol DD of the image printed 322 is in closest proximity to the center symbol DD of the pre-printed image of the target sheet of media 304 for middle Zone 3, symbol DB of the image printed 322 is in closest proximity to symbol DB of the pre-printed image of the target sheet of media 304 for upper Zones 1 and 2, and symbol DF of the image printed 322 is in closest proximity to symbol DF of the pre-printed image of the target sheet of media 304 for lower Zones 4 and 5. Symbol DD may be selected for Zone 3, symbol DB may be selected for Zones 1 and 2, and symbol DF may be selected for Zones 4 and 5.

Since the selection of the location of the image printed 322 on the middle zone (e.g., DD) corresponds to the vertical center axis location of the middle zone of the pre-printed image, the selection of the locations of the image printed 322 on the upper zones (e.g., DB) is a distance away from the vertical center axis (running through center symbols DD) of the upper zones of the pre-printed image, and the selection of the locations of the image printed 322 on the lower zones (e.g., DF) is a distance away from the vertical center axis (running through center symbol DD) of the lower zones of the pre-printed image, the selection may indicate a scaling offset, of the image printed 322, in a vertical direction. As illustrated in FIG. 3C, the scaling offset may indicate that images created by the image forming device (e.g., image printed 322) may not correspond with a predetermined pattern (e.g., pre-printed image) received, by the image forming device, in print data.

Accordingly, the processor may execute instructions stored on the memory resource to calibrate the vertical scaling parameter of the image forming device based on a vertical scale difference between the image printed 322 and the pre-printed image of the target sheet of media 304. For example, the processor may adjust a print placement setting of the image forming device a distance corresponding to the vertical scaling offset of the image printed 322. Calibrating the vertical scaling parameter by adjusting the print placement setting may result in images created (e.g., image printed 322) by the image forming device corresponding with the predetermined pattern (e.g., pre-printed image) received by the image forming device in the print data.

FIG. 3D illustrates an example of a horizontal scaling offset of an image printed 322. The image printed 322 may be overtop of zones 320 on a target sheet of media 304. The target sheet of media 304 may include the same components as the target sheet of media 304 as referenced in FIG. 3A, FIG. 3B, and FIG. 3C. For example, the target sheet of media 304 may include five zones 320 (e.g., two upper zones, two lower zones, and a middle zone) that include a pre-printed pattern of symbols AA through GG, the symbols of each zone being spaced apart a first distance. Symbol DD of the pre-printed pattern of each zone may represent the center of each zone. The image printed 322 may include zones including a pattern of rows and columns of symbols from AA to GG corresponding to the pattern of rows and columns of symbols AA through GG of the pre-printed image. As such, the symbol DD of the image printed 322 may indicate the center of the zone and may correspond to the center symbol DD of the pre-printed image. The symbols in each zone of the image printed 322 may be spaced apart a second distance. The second distance may be greater than, less than, or equal to the first distance.

A processor of a previously described controller may execute instructions stored on a memory resource that cause an image forming device to print the image 322 onto the target sheet of media 304. Locations of symbols printed onto the target sheet of media 304 may be compared to the corresponding locations of symbols pre-printed on the target sheet of media 304. The comparison may be performed by a user and may be input (e.g., via an interface) into the controller and/or the controller may receive an input (e.g., via a scanner) and the comparison may be performed by the controller. The processor may execute instructions stored on the memory resource to determine a scale of the image printed 322 based on the input. The instructions may further include determining a vertical scaling parameter (as described in reference to FIG. 3C) and/or a horizontal scaling parameter of the image forming device based on the scale of the image.

A horizontal scaling offset of the image printed 322 may be indicated by the image printed 322 being stretched away from or contracted toward the horizontal center DD of the pre-printed image. For example, symbols of each zone of the image printed 322 may be compared to symbols of each corresponding zone of the pre-printed image. A location of the pre-printed image and of the image printed 322 on each of upper zones, lower zones, and a middle zone that are in closest proximity to each may be selected. The horizontal scaling offset may be determined based on the selection of locations of the image printed 322 on an upper zone and a lower zone on a right side of the target sheet of media 304 being a distance away from a horizontal center axis of corresponding right side zones of the pre-printed image, the selection of locations of the image printed 322 on an upper zone and a lower zone on a left side of the target sheet of media 304 being a distance away from a horizontal center of corresponding left side zones of the pre-printed image, or a combination thereof, and the selection of a location of the image printed 322 on the middle zone corresponding to a horizontal center axis location of the pre-printed image middle zone. In some examples, the selection of the image printed 322 on the right side zones may be different than the selection of the image printed 322 on the left side zones. A distance away from the horizontal center axis of a zone may be indicated by a selection other than the center DD of the image printed 322.

FIG. 3D depicts a horizontal scaling offset resulting in stretching of an image away from the horizontal center axis of the image, though examples are not so limited and a horizontal scaling offset may result in a contracting of the image toward the horizontal center axis of the image.

As depicted in FIG. 3D, symbol DD of the image printed 322 is in closest proximity to the center symbol DD of the pre-printed image of the target sheet of media 304 for middle Zone 3, symbol FD of the image printed 322 is in closest proximity to the symbol FD of the pre-printed image of the target sheet of media 304 for right upper Zone 2 and right lower Zone 5, and symbol BD of the image printed 322 is in closest proximity to the symbol BD of the pre-printed image of the target sheet of media 304 for left upper Zone 1 and left lower Zone 4. Symbol DD may be selected for Zone 3, symbol FD may be selected for Zones 2 and 5, and symbol BD may be selected for Zones 1 and 4.

Since the selection of the location of the image printed 322 on the middle zone (e.g., DD) corresponds to a horizontal center axis location of the middle zone of the pre-printed image, the selection of the locations of the image printed 322 on the right upper zone and the right lower zone (e.g., FD) is a distance away from the horizontal center axis (running through center symbols DD) of corresponding right side zones of the pre-printed image, and the selection of locations of the image printed 322 on the left upper zone and the left lower zone (e.g., BD) is a distance away from the horizontal center axis (running through center symbols DD) of corresponding left side zones of the pre-printed image, the selection may indicate a scaling offset of the image printed 322 in a horizontal direction. As illustrated in FIG. 3D, the scaling offset may indicate that images created by the image forming device (e.g., image printed 322) may not correspond with a predetermined pattern (e.g., pre-printed image) received by the image forming device in print data.

Accordingly, the processor may execute instructions stored on the memory resource to calibrate the horizontal scaling parameter of the image forming device based on a horizontal scale difference between the image printed 322 and the pre-printed image of the target sheet of media 304. For example, the processor may adjust a print placement setting of the image forming device a distance corresponding to the horizontal scaling offset of the image printed 322. Calibrating the horizontal scaling parameter by adjusting the print placement setting may result in images created (e.g., image printed 322) by the image forming device corresponding with the predetermined pattern (e.g., pre-printed image) received by the image forming device in the print data.

In some cases, selection of symbols may indicate an offset of the vertical scaling parameter and the horizontal scaling parameter of the image printed 322 (not illustrated in FIGS.). Accordingly, the processor may execute instructions stored on the memory resource to determine the vertical scaling parameter and the horizontal scaling parameter of the image forming device based on the scale of the image and calibrate the vertical scaling parameter, the horizontal scaling parameter, or a combination thereof of the image forming device based on the scale of the image printed 322 onto the target sheet of media 304.

Figures 3E, 3F:
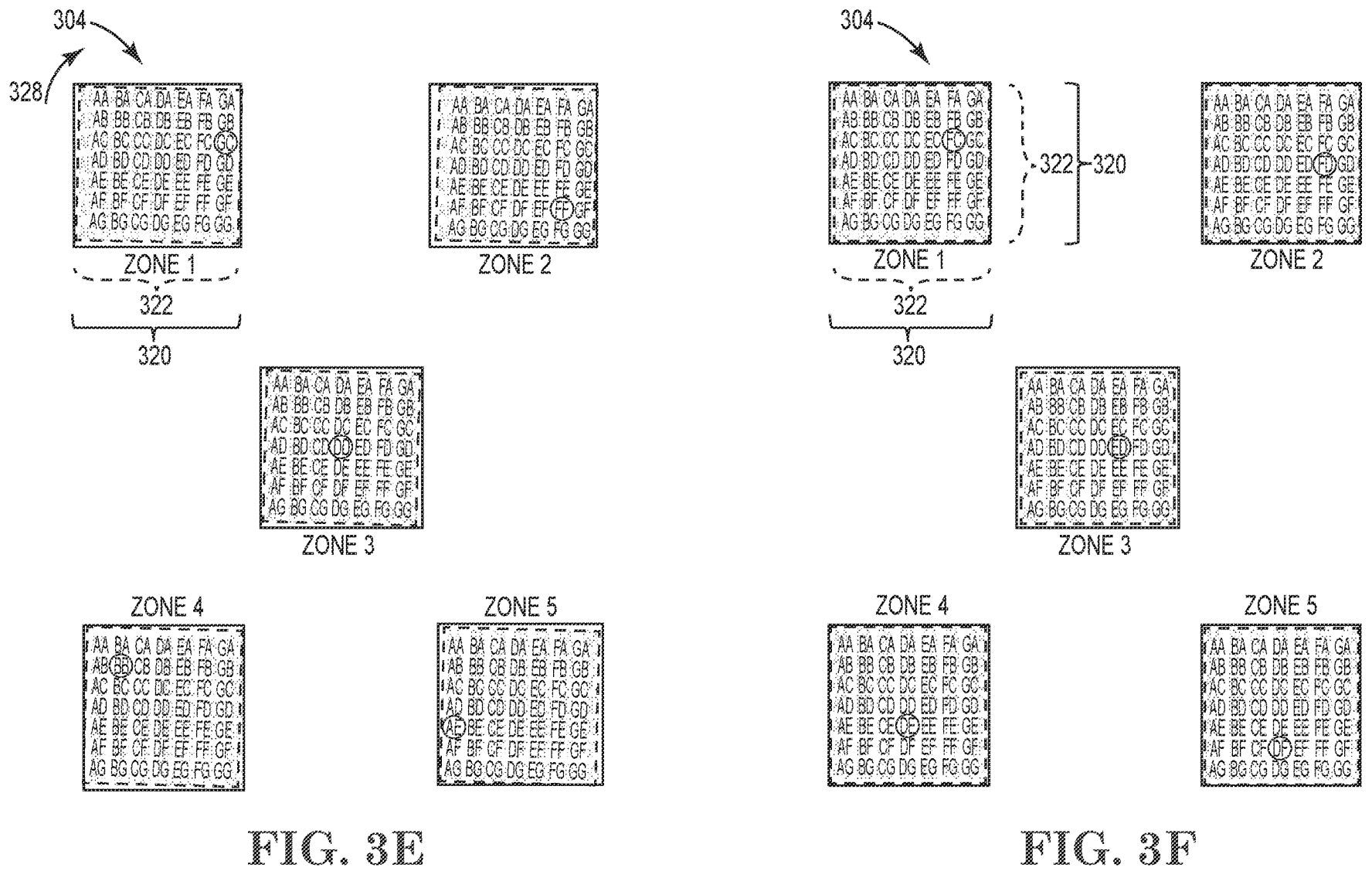

FIG. 3E illustrates an example of a rotational offset of an image printed 322. The image printed 322 may be overtop of zones 320 on a target sheet of media 304. The target sheet of media 304 may include the same components as the target sheet of media 304 as referenced in FIG. 3A, FIG. 3B, FIG. 3C, and FIG. 3D. For example, the target sheet of media 304 may include five zones 320 (e.g., two upper zones, two lower zones, and a middle zone) that include a pre-printed pattern of symbols AA through GG, the symbols of each zone being spaced apart a first distance. Symbol DD of the pre-printed pattern of each zone may represent the center of each zone. The image printed 322 may include zones including a pattern of rows and columns of symbols from AA to GG corresponding to the pattern of rows and columns of symbols AA through GG of the pre-printed image. As such, the symbol DD of the image printed 322 may indicate the center of the zone and may correspond to the center symbol DD of the pre-printed image. The symbols in each zone of the image printed 322 may be spaced apart a second distance. The second distance may be greater than, less than, or equal to the first distance.

A processor of a previously described controller may execute instructions stored on a memory resource of the controller to cause an image forming device to print the image 322 onto the target sheet of media 304. Locations of symbols printed onto the target sheet of media 304 may be compared to the corresponding locations of symbols pre-printed on the target sheet of media 304. The comparison may be performed by a user and may be input (e.g., via an interface) into the controller and/or the controller may receive an input (e.g., via a scanner) and the comparison may be performed by the controller. The processor may execute instructions stored on the memory resource to determine a degree of rotation of the image printed 322 based on the input.

A rotational offset of the image printed 322 may be indicated by the image printed 322 being rotated in a clockwise or counterclockwise direction in relation to the center DD of the pre-printed image. For example, symbols of each zone of the image printed 322 may be compared to symbols of each corresponding zone of the pre-printed image. A location of the pre-printed image and of the image printed 322 on each of upper zones, lower zones, and a middle zone that are in closest proximity may be selected. The degree of rotation of the image printed 322 may be determined based the selection of the middle zone being the center symbol DD and the selection of the upper zones and lower zones including a positioning offset from the center symbol DD of the upper zones and lower zones of the pre-printed image in a clockwise or a counterclockwise direction. FIG. 3E depicts a degree of rotation of the image printed 322 in a clockwise direction 328.

As depicted in FIG. 3E, symbol DD of the image printed 322 is in closest proximity to the center symbol DD of the pre-printed image of the target sheet of media 304 for middle Zone 3. Symbol DD may be selected for Zone 3.

Further, symbol GC of the image printed 322 is in closest proximity to symbol GC of the pre-printed image of the target sheet of media 304 for upper Zone 1. Symbol GC may be selected for Zone 1. Symbol FF of the image printed 322 is in closest proximity to symbol FF of the pre-printed image of the target sheet of media 304 for upper Zone 2. Symbol FF may be selected for Zone 2. Symbol BB of the image printed 322 is in closest proximity to symbol BB of the pre-printed image of the target sheet of media 304 for lower Zone 4. Symbol BB may be selected for Zone 4. Symbol AE of the image printed 322 is in closest proximity to symbol AE of the pre-printed image of the target sheet of media 304 for lower Zone 5. Symbol AE may be selected for Zone 5.

Since the selection of the location of the image printed 322 and the pre-printed image on the middle zone corresponds to a center location of the middle zone (e.g., location DD) and the selection of the locations on the upper zones have a rotational offset in a clockwise direction from the selection of locations of the image printed 322 on the lower zones, the selection may indicate a rotational offset of the image printed 322. As illustrated in FIG. 3E, the rotational offset may indicate that images created by the image forming device (e.g., image printed 322) may not correspond with a predetermined pattern (e.g., pre-printed image) received by the image forming device in print data.

Accordingly, the processor may execute instructions stored on the memory resource to calibrate a rotational parameter of the image forming device based on the degree of rotation (e.g., rotational offset) between the image printed 322 and the pre-printed image of the target sheet of media 304. For example, the processor may adjust a print placement setting of the image forming device a distance corresponding to the degree of rotation of the image printed 322. Calibrating the rotation parameter by adjusting the print placement setting may result in images created (e.g., image printed 322) by the image forming device corresponding with the predetermined pattern (e.g., pre-printed image) received by the image forming device in the print data.

Though FIG. 3O, FIG. 3D, and FIG. 3E respectively illustrate a vertical scaling offset, a horizontal scaling offset, and a degree of rotation determination that includes selection of symbol DD for middle Zone 3, an image forming device that also includes an x-axis positioning offset and/or a y-axis positioning offset may not have the symbol DD selected for middle Zone 3.

FIG. 3F illustrates an example of a positioning, scaling, and rotational offset of an image printed 322. The image printed 322 may be overtop of zones 320 on a target sheet of media 304. The target sheet of media 304 may include the same components as the target sheet of media 304 as referenced in FIG. 3A, FIG. 3B, FIG. 3C, FIG. 3D, and FIG. 3E. For example, the target sheet of media 304 may include five zones 320 (e.g., two upper zones, two lower zones, and a middle zone) that include a pre-printed pattern of symbols AA through GG, the symbols of each zone being spaced apart a first distance. Symbol DD of the pre-printed pattern of each zone may represent the center of each zone. The image printed 322 may include zones including a pattern of rows and columns of symbols from AA to GG corresponding to the pattern of rows and columns of symbols AA through GG of the pre-printed image. As such, the symbol DD of the image printed 322 may indicate the center of the zone and may correspond to the center symbol DD of the pre-printed image. The symbols in each zone of the image printed 322 may be spaced apart a second distance. The second distance may be greater than, less than, or equal to the first distance.

A processor of a previously described controller may execute instructions stored on a memory resource of the controller to cause an image forming device to print the image 322 onto the target sheet of media 304. Locations of symbols printed onto the target sheet of media 304 may be compared to the corresponding locations of symbols pre-printed on the target sheet of media 304. The comparison may be performed by a user and may be input (e.g., via an interface) into the controller and/or the controller may receive an input (e.g., via a scanner) and the comparison may be performed by the controller. The processor may execute instructions stored on the memory resource to determine a position, a scale, and a degree of rotation of the image printed 322 based on the input. The instructions may further include determining, based on the input into the image forming device, an x-axis positioning offset, and a y-axis positioning offset, a vertical scale difference, and a horizontal scale difference, between the image printed 322 and the pre-printed image on the target sheet of media 304.

For example, symbols of each zone of the image printed 322 may be compared to symbols of each corresponding zone of the pre-printed image. A location of the pre-printed image and of the image printed 322 on each of upper zones, lower zones, and a middle zone that are in closest proximity may be selected. The position, scale, and/or degree of rotation may be determined based on a selection of a symbol of the image printed 322 and a selection of a symbol of the pre-printed image on the upper zones, the lower zones, and the middle zone. For example, the position, scale, and/or rotation of the image printed 322 may be determined based the selection of both the image printed 322 and the pre-printed image symbols in each of the zones 320. FIG. 3F depicts a positioning offset, scaling offset, and a degree of rotation of the image printed 322.

As depicted in FIG. 3F, symbol FC of the image printed 322 is in closest proximity to symbol FC of the pre-printed image of the target sheet of media 304 for upper Zone 1.

Symbol FC may be selected for Zone 1. Symbol FD of the image printed 322 is in closest proximity to symbol FD of the pre-printed image of the target sheet of media 304 for upper Zone 2. Symbol FD may be selected for Zone 2. Symbol ED of the image printed 322 is in closest proximity to symbol ED of the pre-printed image of the target sheet of media 304 for middle Zone 3. Symbol ED may be selected for Zone 3. Symbol DE of the image printed 322 is in closest proximity to symbol DE of the pre-printed image of the target sheet of media 304 for lower Zone 4. Symbol DE may be selected for Zone 4. Symbol DF of the image printed 322 is in closest proximity to symbol DF of the pre-printed image of the target sheet of media 304 for lower Zone 5. Symbol DF may be selected for Zone 5.

Accordingly, the processor may execute instructions stored on the memory resource to calibrate a position parameter (e.g., x-axis position and/or y-axis position), a scaling parameter (e.g., vertical scale or horizontal scale), rotation parameter (e.g., clockwise direction or counter-clockwise direction), or a combination thereof of the image forming device based on the position, scale, and/or degree of rotation between the image printed 322 and the pre-printed image of the target sheet of media 304. For example, the processor may adjust a print placement setting of the image forming device a distance corresponding to the x-axis position parameter, y-axis position parameter, vertical scaling parameter, horizontal scaling parameter, and/or rotation parameter of the image printed 322. Calibrating the x-axis position parameter, y-axis position parameter, vertical scaling parameter, horizontal scaling parameter, and/or rotation parameter by adjusting the print placement setting may result in images created (e.g., image printed 322) by the image forming device corresponding with the predetermined pattern (e.g., pre-printed image) received by the image forming device in the print data.

Figure 3G:
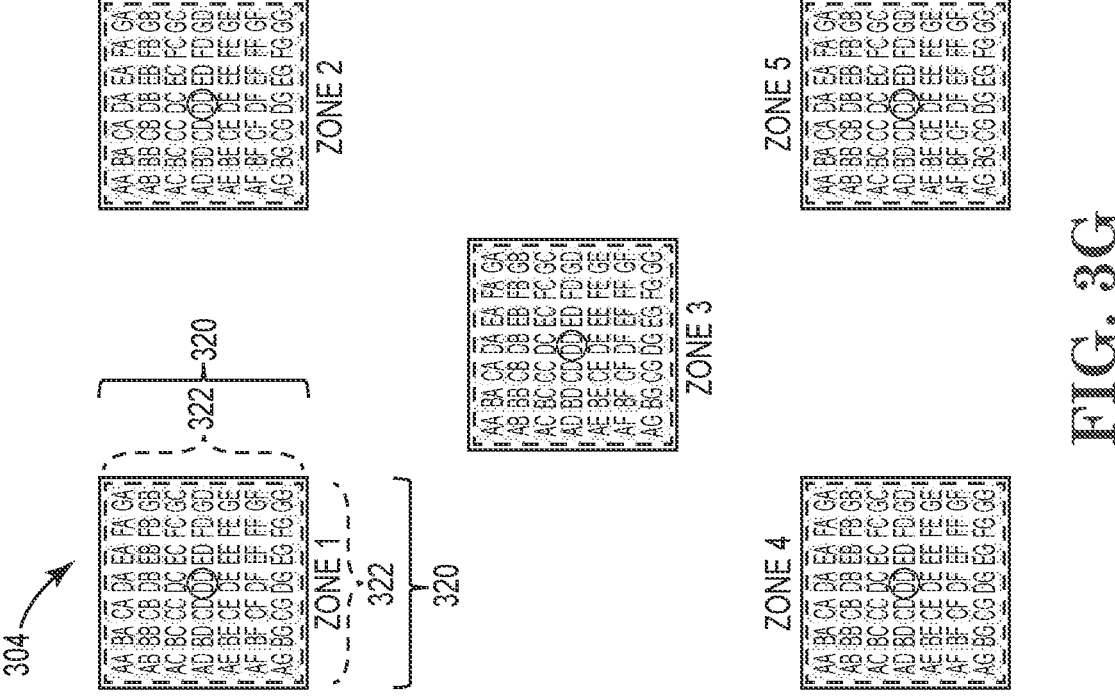
FIG. 3G illustrates an example of a calibrated image.

FIG. 3G illustrates an example of a calibrated image 322. The image printed 322 may be overtop of zones 320 on a target sheet of media 304. The target sheet of media 304 may include the same components as the target sheet of media 304 as referenced in FIG. 3A, FIG. 3B, FIG. 3C, FIG. 3D, FIG. 3E, and FIG. 3F. For example, the target sheet of media 304 may include five zones 320 including a pre-printed pattern of symbols AA through GG, the symbols of each zone being spaced apart a first distance. Symbol DD of the pre-printed pattern of each zone may represent the center of each zone. The image printed 322 may include corresponding zones including a corresponding pattern of rows and columns of symbols from AA to GG. As such, the symbol DD of the image printed 322 may indicate the center of the zone and may correspond to the center symbol DD of the pre-printed image. The symbols in each zone of the image printed 322 may be spaced apart a second distance. The second distance may be greater than, less than, or equal to the first distance.

A processor of a previously described controller may execute instructions stored on a memory resource of the controller to cause an image forming device to print the image 322 onto the target sheet of media 304. Locations of symbols printed onto the target sheet of media 304 may be compared to the corresponding locations of symbols pre-printed on the target sheet of media 304. The processor may execute instructions stored on the memory resource to determine a position, a scale, and a degree of rotation of the image printed 322 based on the input. The instructions may further include determining, based on the input into the image forming device, that the image forming device does not include an x-axis positioning offset, a y-axis positioning offset, a vertical scale difference, a horizontal scale difference, or may determine that the degree of rotation is zero between the image printed 322 and the pre-printed image on the target sheet of media 304. As such, it may be determined that the image forming device print is calibrated to the target sheet of media 304.

For example, symbols of each zone of the image printed 322 may be compared to symbols of each corresponding zone of the pre-printed image. A location of the pre-printed image and of the image printed 322 on each of upper zones, lower zones, and a middle zone that are in closest proximity may be selected. As depicted in FIG. 3G, symbol DD of the image printed 322 is in closest proximity to symbol DD of the pre-printed image of the target sheet of media 304 for Zones 1, 2, 3, 4, and 5. Symbol DD may be selected for Zones 1, 2, 3, 4, and 5.

Accordingly, the processor may execute instructions stored on the memory resource to determine that since the selection for each zone is DD, calibration of an x-axis position parameter, y-axis position parameter, vertical scaling parameter, horizontal scaling parameter, and/or rotation parameter, is not to be performed. As such, the image forming device may refrain from performing a calibration of the x-axis position parameter, y-axis position parameter, vertical scaling parameter, horizontal scaling parameter, and/or rotation parameter of the image forming device.

FIGS. 3A-3G illustrate one symbol of the image printed 322 being in closest proximity to one symbol of the pre-printed image; however, examples are not so limited and more than one symbol of the image printed 322 may be in closest proximity to more than one corresponding symbol of the pre-printed image. Thus, more than one symbol/location may be selected.

Figure 4:
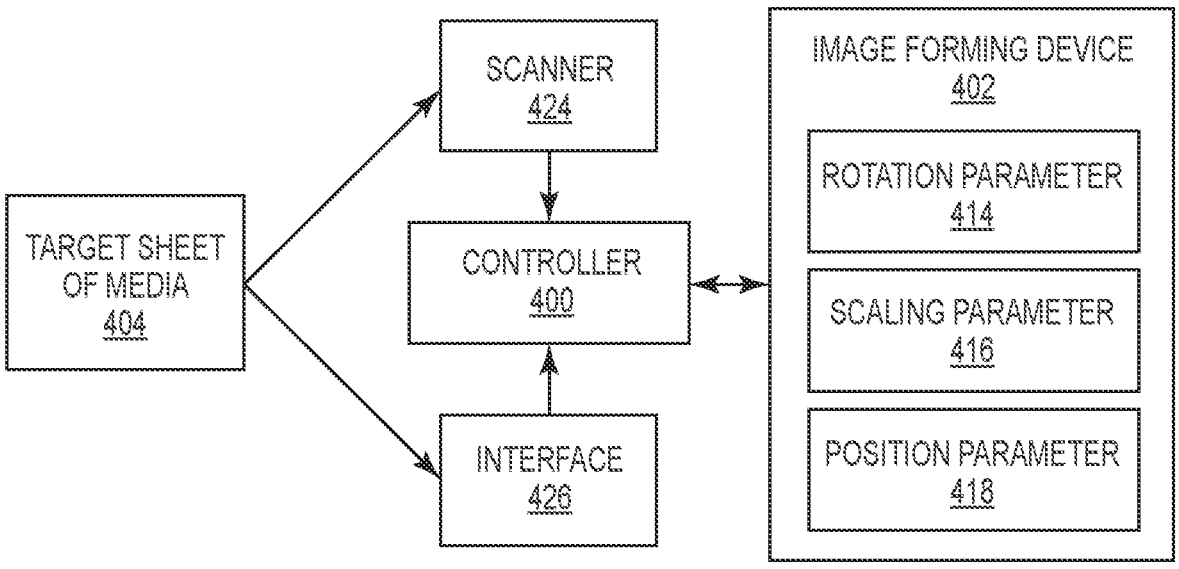
FIG. 4 illustrates a block diagram for performing a comparison between a pre-printed image and an image printed onto a target sheet of media for calibration of a device.

FIG. 4 illustrates a block diagram for performing a comparison between a pre-printed image and an image printed onto a target sheet of media 404 for calibration of a device. The device may be an image forming device 402. The image printed may be printed onto the target sheet of media 404 via the image forming device 402. The image forming device 402 may include the same components as the image forming device 102 as referenced in FIG. 1. For example, the image forming device 402 may include an input tray, a print zone, and a media path to route the target sheet of media 404 from the input tray to the print zone of the image forming device 402.

The image forming device 402 may also include a rotation parameter 414, a scaling parameter 416, and a position parameter 418. For example, the rotation parameter 414, the scaling parameter 416, and the position parameter 418 may determine placement of an image printed onto a sheet of media. Tolerances in the manufacturing of or wear and tear on hardware of the image forming device 402, such as rollers, belts, sensors, motors, gears, etc. utilized in aligning and transporting the sheet of media through the media path, components of the input tray and/or print zone, etc. may cause a print of the image forming device 402 to be misaligned or non-uniform. To compensate for this misalignment or non-uniformity, the rotation parameter 414, the scaling parameter 416, and/or the position parameter 418 of the image forming device 402 may be calibrated. The image forming device 402 may be calibrated upon initial start up of the image forming device 402 and/or after a specific amount and/or time of use.

For example, the target sheet of media 404 may include a pre-printed image centered on the target sheet of media 404. Put another way, the pre-printed image of the target sheet of media 404 may include an image including a target rotation, scale, and position. The pre-printed image of the target sheet of media 404 may include a pattern of symbols. Accordingly, an image including a corresponding pattern of symbols may be printed onto the target sheet of media 404. The pre-printed pattern of symbols may be compared to the corresponding pattern of symbols of the image printed. In some examples, a symbol of the pre-printed pattern of symbols and a symbol of the corresponding pattern of symbols printed onto the target sheet of media 404 that are in closest proximity to each other are selected. The selected symbols from the comparison may be input into a controller 400 coupled to the image forming device 402 and the input may be used to calibrate the rotation parameter 414, the scaling parameter 416, and/or the position parameter 418 of the image forming device 402.

For example, the image printed may be compared to the pre-printed image by a user of the controller 400 and/or the image forming device 402. The user may utilize a communication interface 426 coupled to the controller 400 and/or the image forming device 402 to input the comparison. The image forming device 402 may include the interface 426 or the interface 426 may be a part of a device separate from and communicatively coupled to the image forming device 402 via a wired or wireless connection. The interface 426 may include a keyboard, keypad, mouse, speaker, microphone, and/or other devices such as a touch screen (not shown) utilized in receiving the input from the user. The interface 426 may be coupled to a display device (not shown) that provides a graphical user interface (GUI) for the user to interact with while inputting the comparison.

In some examples, a scanner 424 may be coupled to the controller 400 and/or the image forming device 402. A scanner refers to a device comprising a light capture element, such as a charge-coupled device (CCD), a contact image sensor (CIS), etc., capable of receiving light and converting the light into signals that are sent on to a processor. In some cases, this process of capturing and converting light may be referred to as the digitization of an image. The scanner 424 may be part of the image forming device 402 (incorporated into the image forming device 402) or may be connected externally to the image forming device 402 (e.g., hardwired or via wireless connection). The scanner 424 may be used to scan (e.g., optically scan) the image printed onto the target sheet of media 404. As used herein, the term "scan" may refer to a process of optically capturing markings such as text and/or images, such as may be formed on a medium, and converting the text and/or images to a digital image. Accordingly, the comparison of the symbols input into the controller 400 may be determined for a scan of the image printed onto the target sheet of media 404.

FIG. 5 illustrates an example of a processor 506 associated with a memory resource 508 for performing a calibration on an image forming device 502. In some examples, the processor 506 and memory resource 508 are part of a computing device or controller that can be communicatively coupled to the image forming device 502. For example, the memory resource 508 may be part of the image forming device 102 as referenced in FIG. 1 and image forming device 402 as referenced in FIG. 4. In some examples, the memory resource 508 is communicatively coupled to the processor 506 that executes instructions 530, 532, 534, 536, 538, stored on the memory resource 508. For example, the memory resource 508 is communicatively coupled to the processor 506 through a communication path. In some examples, a communication path includes a wired or wireless connection that allows communication between devices and/or components within a single device.

The memory resource 508 may be electronic, magnetic, optical, or other physical storage device that stores executable instructions. Thus, a non-transitory machine-readable medium (MRM) (e.g., a memory resource 508) may be, for example, a non-transitory MRM comprising Random-Access Memory (RAM), read-only memory (ROM), an Electrically-Erasable Programmable ROM (EEPROM), a storage drive, an optical disc, and the like. The non-transitory machine-readable medium (e.g., a memory resource 508) may be disposed within a controller and/or computing device. In this example, the executable instructions 530, 532, 534, 536, 538, can be "installed" on the device. Additionally, and/or alternatively, the non-transitory machine-readable medium (e.g., a memory resource 508) can be a portable, external or remote storage medium, for example, that allows a computing system to download the instructions 530, 532, 534, 536, 538, from the portable/external/remote storage medium. In this situation, the executable instructions may be part of an "installation package." As described herein, the non-transitory machine-readable medium (e.g., a memory resource 508) can be encoded with executable instructions for establishing transfer locations.

In some examples, the memory resource 508 includes instructions 530 to cause a target sheet of media to be fed from an input of the image forming device 502 to a print zone of the image forming device 502 through a media path of the image forming device 502. The target sheet of media may include a pre-printed image including symbols arranged within zones of the target sheet of media.

In some examples, the memory resource 508 includes instructions 532 to cause the image forming device 502 to print, while the target sheet of media is in the print zone, an image onto the target sheet of media. The image forming device 502 may print an image with symbols corresponding to the symbols of the pre-printed image and arranged in zones corresponding to the pre-printed zones of the target sheet of media.

In some examples, the memory resource 508 includes instructions 534 to receive an input corresponding to the image printed onto the target sheet of media. For example, symbols of each zone of the image printed may be compared to corresponding symbols of each zone of the pre-printed image. The input may be based on a selection of a symbol in each zone of the image printed and a selection of a symbol in each corresponding zone of the pre-printed image that are in closest proximity to each other.

In some examples, the memory resource 508 includes instructions 536 to determine, based on the input, a scale of the image printed. The instructions may further include determining, based on the input, a vertical scaling parameter and a horizontal scaling parameter of the image forming device 502 based on the scale of the image. The memory resource 508 may include further instructions to determine, based on the input, a degree of rotation of the image printed and/or an x-axis position and/or a y-axis position of the image printed. As such, the instructions may include determining, based on the input, a rotation parameter and/or a position parameter, such as an x-axis position parameter and/or a y-axis position parameter, of the image forming device 502.

In some examples, the memory resource 508 includes instructions 538 to calibrate a scaling parameter of the image forming device 502 in response to the scale of the image determined from the input. For example, the vertical scaling parameter, horizontal scaling parameter, or a combination thereof may be calibrated based on the input received. The memory resource 508 may include further instructions to calibrate the rotation parameter, the x-axis position parameter, and/or the y-axis position parameter of the image forming device 502. Accordingly, the vertical scaling parameter, horizontal scaling parameter, rotation parameter, x-axis position parameter, y-axis position parameter, or a combination thereof may be calibrated in response to a scale, rotation, and position of the image printed, determined from the input.

FIG. 6 illustrates an example of a method 600 for calibrating a device based on a comparison between a pre-printed image and an image printed onto a target sheet of media. For example, the method 600 includes instructions or elements that are stored on a non-transitory memory resource that are executed by a processor to perform the corresponding functions. As described further herein, the memory resource includes instructions 640, 642, 644, 646, 648, that are executed by the processor to perform particular functions.

The device includes components such as the processor. As used herein, the processor includes, but is not limited to: a central processing unit (CPU), an application specific integrated circuit (ASIC), a field programmable gate array (FPGA), a metal-programmable cell array (MPCA), a semiconductor-based microprocessor, or other combination of circuitry and/or logic to orchestrate execution of instructions 640, 642, 644, 646, 648. In other examples, the device includes instructions 640, 642, 644, 646, 648, stored on a machine-readable medium (e.g., memory resource, non-transitory computer-readable medium, etc.) and executable by the processor. In a specific example, the device utilizes a non-transitory computer-readable medium storing instructions 640, 642, 644, 646, 648, that, when executed, cause the processor to perform corresponding functions.

In some examples, the method 600 may include printing, via an image forming device, onto the target sheet of media including a pre-printed image, an image at 640. The pre-printed image may be located in zones of the target sheet of media including upper zones, lower zones, and a middle zone, though examples are not so limited and there may be any number of zones including one. The image printed on the target sheet of media may be printed overtop of the pre-printed image. For example, the image printed may be printed overtop of the upper zones, the lower zones, and the middle zone of the pre-printed image of the target sheet of media.

In some examples, the method 600 may include receiving, via the processor, an input corresponding to the image printed onto the target sheet of media at 642. As previously described herein, the input may be received via a scanner and/or via an interface coupled to the processor and/or image forming device.

In some examples, the method 600 may include determining, via the processor, based on the input, a selection of a location of the image printed and a location of the pre-printed image that are in closest proximity to each other at 644. For example, the method may include comparing locations of symbols printed onto the target sheet of media to corresponding locations of symbols pre-printed on the target sheet of media. A location of the pre-printed image and a location of the image printed on each of the upper zones, lower zones, and the middle zone that are in closest proximity to each other may be selected.

In some examples, the method 600 may include determining, via the processor, based on the selection, a degree of rotation and a scale of the image printed onto the target sheet of media at 646. The scale of the image printed may include a vertical scale, a horizontal scale, or a combination thereof.

Determining the degree of rotation of the image printed onto the target sheet of media may include determining that the selection of locations of the image printed on the upper zones and the lower zones includes a positioning offset from a center of the upper zones and lower zones in a clockwise or a counterclockwise direction and determining that the selection of a location of the image printed on the middle zone corresponds to a center location of the middle zone.

Determining the scale of the image printed onto the target sheet of media may include determining a vertical scale difference between the image printed and the pre-printed image on the target sheet of media. The determination may be based on the selection of locations of the image printed on the upper zones being a distance away from a vertical center axis of the pre-printed image upper zones, the selection of locations of the image printed on the lower zones being a distance away from a vertical center axis of the pre-printed image lower zones, or a combination thereof, the selection of the upper zones being different than the selection of the lower zones, and the selection of a location of the image printed on the middle zone corresponding to a vertical center axis location of the pre-printed image middle zone.

Determining the scale of the image printed onto the target sheet of media may include determining a horizontal scale difference between the image printed and the pre-printed image on the target sheet of media. The determination may be based on the selection of locations of the image printed on an upper zone and a lower zone on a right side of the target sheet of media being a distance away from a horizontal center axis of corresponding right side zones of the pre-printed image, the selection of locations of the image printed on an upper zone and a lower zone on a left side of the target sheet of media being a distance away from a horizontal center axis of corresponding left side zones of the pre-printed image, or a combination thereof, the selection of the right side zones being different than the selection of the left side zones, and the selection of a location of the image printed on the middle zone corresponding to a horizontal center axis location of the pre-printed image middle zone.

In some examples, the method may further include determining, via the processor, based on the input into the image forming device, an x-axis positioning offset and y-axis positioning offset between the image printed and the pre-printed image on the target sheet of media. The determination may be based on the selection of locations of the image printed on the upper zones, the lower zones, and the middle zone indicating a positioning offset in a vertical direction, a horizontal direction, or a combination thereof.

Accordingly, the method may include determining, via the processor, based on the input into the image forming device, a degree of rotation, a vertical scale difference, a horizontal scale difference, an x-axis positioning offset, a y-axis positioning offset, or a combination thereof, between the image printed and the pre-printed image on the target sheet of media. The determination may be based on the selection of locations of the image printed on the upper zones, the lower zones, and the middle zone that are in closest proximity to locations of the pre-printed image of the upper zones, the lower zones, and the middle zone, respectively.

In some examples, the method 600 may include calibrating, via the processor, a rotation parameter, a scaling parameter, or a combination thereof, of the image forming device based on the degree of rotation and the scale of the image printed onto the target sheet of media at 648. For example, calibrating, via the processor, a vertical scaling parameter of the image forming device may be based on the vertical scale difference and calibrating, via the processor, a horizontal scaling parameter of the image forming device may be based on the horizontal scale difference.

Further, the method may include calibrating, via the processor, a position parameter of the image forming device based on an x-axis position and a y-axis position of the image printed onto the target sheet of media. As such, the method may include calibrating, via the processor, the rotation parameter, the vertical scaling parameter, the horizontal scaling parameter, the x-axis position parameter, the y-axis position parameter, or a combination thereof, of the image forming device.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" refers to one such thing or more than one such thing.

The figures herein follow a numbering pattern in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the device, system, and methods of the disclosure. Since many examples can be made without departing from the spirit and scope of the system and method of the disclosure, this specification merely sets forth some of the many possible example processes and implementations.

What is claimed is:

1. A controller, comprising:
   a processor; and
   a memory storing instructions executable by the processor, wherein the processor is to execute the instructions to:
   cause an image forming device to print an image onto a target sheet of media routed through a media path from an input media tray, wherein the target sheet of media includes a pre-printed pattern of symbols arranged in a plurality of predefined zones, each zone having a calibrated orientation, and wherein the image includes a corresponding pattern of symbols arranged in the plurality of predefined zones;
   receive an input corresponding to the image printed onto the target sheet of media, wherein for each zone, the pre-printed pattern of symbols is compared to the corresponding pattern of symbols of the printed image and a pre-printed symbol and a printed symbol located in the same zone that are in closest proximity to each other are selected;

determine, based on the selected symbols across the plurality of zones, a degree of rotation of the image; and calibrate a rotation parameter of the image forming device in response to the degree of rotation determined from the zone-based proximity selection.

2. The controller of claim 1, wherein the processor is to further determine, based on the selected symbols across the plurality of zones, a scale of the image and based on the scale of the image, calibrate a scaling parameter of the image forming device, wherein the scale is determined from the zone-based proximity selection.

3. The controller of claim 2, wherein the scaling parameter is a vertical scaling parameter.

4. The controller of claim 2, wherein the scaling parameter is a horizontal scaling parameter.

5. The controller of claim 1, wherein the processor is to further:

determine, based on the selected symbols across the plurality of zones, an x-axis position and y-axis position of the image; and based on the x-axis position and y-axis position of the image determined from the zone-based proximity selection, calibrate a position parameter of the image forming device.

6. The controller of claim 1, wherein:

the image forming device is coupled to a scanner, the scanner to scan the image printed onto the target sheet of media; and the input is based on a scan of the image printed onto the target sheet of media wherein the processor is to further:

for each zone, compare the pre-printed pattern of symbols to the corresponding pattern of symbols of the image printed onto the target sheet of media; and select a pre-printed symbol and a printed symbol printed onto the target sheet of media located in the same zone that are in closest proximity to each other.

7. The controller of claim 1, wherein the input is:

based on a comparison of the pre-printed pattern of symbols to the corresponding pattern of symbols and comprises:

a selection of a pre-printed and a printed symbol located in the same zone printed onto the target sheet of media that are in closest proximity to each other for each zone; and received via an interface coupled to the image forming device.

8. A non-transitory memory resource storing machine-readable instructions stored thereon that, when executed, cause a processor of an image forming device to:

cause a target sheet of media to be fed from an input tray of the image forming device to a print zone of the image forming device through a media path of the image forming device;

cause the image forming device to print, while the target sheet of media is in the print zone, an image onto the target sheet of media, the target sheet of media including a pre-printed pattern of symbols arranged in a plurality of predefined zones, each zone having a calibrated orientation, and the image including a corresponding pattern of symbols arranged in the plurality of predefined zones;

receive an input corresponding to the image printed onto the target sheet of media;

for each zone, compare the pre-printed pattern of symbols to the corresponding pattern of symbols of the image printed onto the target sheet of media and select a pre-printed symbol and a printed symbol located in the same zone that are in closest proximity to each other;

determine, based on the selected symbols across the plurality of zones, a scale of the image; and calibrate a scaling parameter of the image forming device in response to the scale of the image determined from the zone-based proximity selection.

9. The non-transitory memory resource of claim 8, wherein the machine-readable instructions, when executed, further cause the processor to determine a vertical scaling parameter and a horizontal scaling parameter of the image forming device based on the scale of the image determined from the zone-based proximity selection, wherein calibrating the scaling parameter of the image forming device includes calibrating the vertical scaling parameter, the horizontal scaling parameter, or a combination thereof.

10. The non-transitory memory resource of claim 8, wherein the machine-readable instructions, when executed, further cause the processor to:

determine, based on the selected symbols across the plurality of zones, a degree of rotation of the image; and calibrate, based on the degree of rotation of the image determined from the zone-based proximity selection, a rotation parameter of the image forming device.

11. The non-transitory memory resource of claim 8, wherein the machine-readable instructions, when executed, further cause the processor to:

determine, based on the selected symbols across the plurality of zones, an x-axis position and a y-axis position of the image; and calibrate, based on the x-axis position and the y-axis position of the image determined from the zone-based proximity selection, a position parameter of the image forming device.

12. A method, comprising:

printing, via an image forming device, onto a target sheet of media an image, the target sheet of media including a pre-printed pattern of symbols arranged in a plurality of predefined zones, each zone having a calibrated orientation, and the image including a corresponding pattern of symbols arranged in the plurality of predefined zones;

receiving, via a processor, an input corresponding to the image printed onto the target sheet of media;

for each zone, comparing the pre-printed pattern of symbols to the corresponding pattern of symbols of the image printed onto the target sheet of media and selecting a pre-printed symbol and a printed symbol located in the same zone that are in closest proximity to each other;

determining, via the processor, based on the selected symbols across the plurality of zones a degree of rotation and a scale of the image printed onto the target sheet of media; and calibrating, via the processor, a rotation parameter, a scaling parameter, or a combination thereof, of the image forming device based on the degree of rotation and the scale of the image determined from the zone-based proximity selection.

13. The method of claim 12, further comprising comparing locations of symbols spaced a second distance apart and printed onto the target sheet of media to locations of corresponding symbols spaced a first distance apart and pre-printed on the target sheet of media across the plurality of predefined zones.

14. The method of claim 12, wherein:

the plurality of predefined zones of the target sheet of media includes upper zones, lower zones, and a middle zone;

the image printed on the target sheet of media is printed on the upper zones, the lower zones, and the middle zone; and for each zone, a pre-printed symbol and a printed symbol printed on each of the upper zones, lower zones, and the middle zone that are in closest proximity to each other are selected.

15. The method of claim 14, wherein determining the degree of rotation of the image printed onto the target sheet of media comprises:

determining that the selection of printed symbols printed on the upper zones and the lower zones includes a positioning offset from a center of the upper zones and lower zones in a clockwise or a counterclockwise direction; and determining that the selection of a printed symbol printed on the middle zone corresponds to a center location of the middle zone.

16. The method of claim 14, further comprising:

determining, via the processor, a vertical scale difference between the image printed and the pre-printed pattern of symbols on the target sheet of media based on:

the selection of printed symbols printed on the upper zones being a distance away from a vertical center axis of the pre-printed pattern of symbols in the upper zones, the selection of printed symbols printed on the lower zones being a distance away from a vertical center axis of the pre-printed pattern of symbols in the lower zones, or a combination thereof;

the selection of the upper zones being different than the selection of the lower zones; and the selection of a printed symbol printed on the middle zone corresponding to a vertical center axis location of the pre-printed pattern of symbols in the middle zone; and calibrating, via the processor, a vertical scaling parameter of the image forming device based on the vertical scale difference determined from the zone-based proximity selection.

17. The method of claim 14, further comprising:

determining, via the processor, a horizontal scale difference between the image printed and the pre-printed pattern of symbols on the target sheet of media based on:

the selection of printed symbols printed on an upper zone and a lower zone on a right side of the target sheet of media being a distance away from a horizontal center axis of corresponding right side zones of the pre-printed pattern of symbols, the selection of printed symbols printed on an upper zone and a lower zone on a left side of the target sheet of media being a distance away from a horizontal center axis of corresponding left side zones of the pre-printed pattern of symbols, or a combination thereof;

the selection of the right side zones being different than the selection of the left side zones; and the selection of a printed symbol printed on the middle zone corresponding to a horizontal center axis location of the pre-printed pattern of symbols in the middle zone; and calibrating, via the processor, a horizontal scaling parameter of the image forming device based on the horizontal scale difference determined from the zone-based proximity selection.

18. The method of claim 14, further including:

determining, via the processor, based on the selected symbols across the plurality of zones, an x-axis positioning offset and a y-axis positioning offset between the image printed and the pre-printed pattern of symbols on the target sheet of media based on:

the selection of printed symbols printed on the upper zones, the lower zones, and the middle zone indicating a positioning offset in a vertical direction, a horizontal direction, or a combination thereof; and calibrating, via the processor, a position parameter of the image forming device based on an x-axis position and a y-axis position of the image printed onto the target sheet of media determined from the zone-based proximity selection.

19. The method of claim 14, further including:

determining, via the processor, based on the selected symbols across the plurality of zones, a degree of rotation, a vertical scale difference, a horizontal scale difference, an x-axis positioning offset, and a y-axis positioning offset between the image printed and the pre-printed pattern of symbols on the target sheet of media based on:

the selection of printed symbols printed on the upper zones, the lower zones, and the middle zone that are in closest proximity to pre-printed symbols in the upper zones, the lower zones, and the middle zone, respectively.

* * * * *